United States Patent
Kato et al.

(10) Patent No.: US 7,180,678 B2
(45) Date of Patent: Feb. 20, 2007

(54) LENS UNIT AND IMAGE TAKING APPARATUS

(75) Inventors: Takashi Kato, Minami-Ashigara (JP); Takao Kiuchi, Asaka (JP); Hitoshi Miyano, Saitama (JP)

(73) Assignees: Fuji Photo Film Co., Ltd., Kanagawa (JP); Fujinon Corporation, Saitama (JP)

( * ) Notice: Subject to any disclaimer, the term of this patent is extended or adjusted under 35 U.S.C. 154(b) by 22 days.

(21) Appl. No.: 11/209,658

(22) Filed: Aug. 24, 2005

(65) Prior Publication Data

US 2006/0056041 A1    Mar. 16, 2006

(30) Foreign Application Priority Data

Aug. 26, 2004    (JP)    ............................. 2004-246726

(51) Int. Cl.
*G02B 3/12*    (2006.01)
*G03B 13/00*    (2006.01)

(52) U.S. Cl. .................. 359/665; 348/345; 348/349
(58) Field of Classification Search ............... 348/345, 348/349, 350; 359/665, 666
See application file for complete search history.

(56) References Cited

U.S. PATENT DOCUMENTS 6,449,081 B1* 9/2002 Onuki et al. ................. 359/245
2006/0193058 A1* 8/2006 Ootsuka et al. ............. 359/665

FOREIGN PATENT DOCUMENTS

| JP | 2000-347005 A | 12/2000 |
| JP | 2001-519539 A | 10/2003 |
| WO | WO 99/18456 A1 | 4/1999 |

OTHER PUBLICATIONS

Philips' Fluid Lenses, in Digital Photography Review (dpreview.com), Mar. 3, 2004.

* cited by examiner

*Primary Examiner*—David N. Spector
(74) *Attorney, Agent, or Firm*—Sughrue Mion, PLLC

(57) ABSTRACT

Mutually non-mixable light-transmitting insulative liquid and conductive liquid having different refractive indices are accommodated in a light-transmitting liquid container forming a lens unit. The lens unit includes a first electrode which is in contact with the conductive liquid, one or more second electrodes which are insulated from the conductive liquid, and a correcting section which controls voltage to be applied between the first electrode and at least one of the second electrodes in accordance with a gravity direction, thereby changing a shape of an interface between the insulative liquid and the conductive liquid to correct distortion of the interface caused by the gravity.

4 Claims, 6 Drawing Sheets

LENS UNIT AND IMAGE TAKING APPARATUS

BACKGROUND OF THE INVENTION

1. Field of the Invention

The present invention relates to a lens unit through which light passes, and an image taking apparatus which obtains image data by forming an image of a subject.

2. Description of the Related Art

Some of electronic still cameras which form an image of a subject on a solid imaging element such as a charge coupled device (CCD) and which captures image data representing the subject as a signal, and some of film cameras which shoot a subject on a photographic film include zoom function for freely setting shooting angle of view. Such a camera includes a shooting lens whose focal length is varied in accordance with operation of a zoom switch. This shooting lens generally is a compound lens comprising a combination of lens elements, and relative positions of the lens elements are adjusted in accordance with focal length which is set by the zoom switch. Such a camera includes a cam mechanism, the cam mechanism transmits rotation of a motor in accordance with operation of the zoom switch, thereby moving the lens elements forward and backward in an optical axis to adjust the relative positions, and the focal length is changed.

A focus lens for adjusting focus is included in the lens elements. A lens driving mechanism for moving the focus lens is disposed independently from the cam mechanism in some cases.

As an alternative lens of the shooting lens having the driving mechanism, it is recently proposed a liquid lens having variable focal length in which two kinds of mutually non-mixable liquids having different refractive indices are accommodated (see non-patent document "Philips Fluid Lenses", [online], dated Mar. 3, 2004, by Royal Philips Electronics, [Searched on Mar. 31, 2004], the Internet <URL: http://www.dpreview.com/news/0403/04030302philipsfluidlens.asp> for example).

The two kinds of mutually non-mixable liquids having different refractive indices are accommodated in the liquid lens proposed in the non-patent document. One of the two kinds of liquids is conductive aqueous solution, and the other liquid is insulative oil. The two kinds of liquids are accommodated in a short glass tube liquid container. Both ends of the liquid container are closed with light-transmitting clear endcaps. An inner wall of this tube and an inner wall of one of the endcaps are covered with repellency films. According to the liquid lens having such a structure, the conductive aqueous solution of the two kinds of liquids is repulsed from the inner wall of the tube covered with the repellency film and from the inner wall of the one endcap. Since the conductive aqueous solution stays in a form of a semi-spherical shape in a state in which the conductive aqueous solution is in contact with the other endcap, an interface portion between the conductive aqueous solution and the insulative oil functions as a concave lens. The liquid lens is also provided with two electrodes for applying voltage to the conductive aqueous solution. One of the two electrodes is disposed in contact with the conductive aqueous solution, and the other electrode is disposed behind the repellency film. If voltage is applied to such electrodes, the electrode disposed in contact with the conductive aqueous solution discharges electric charge into the conductive aqueous solution, and the discharged electric charge is accumulated in the interface portion between the conductive aqueous solution and the insulative oil therein. The electric charge accumulated in the interface portion and electric charge collected in the electrode disposed behind the repellency film having opposite pole from that of the former electric charge attract each other due to the Coulomb force, and the electric charge in the conductive aqueous solution is attracted close to the repellency film. As a result, the conductive aqueous solution starts wetting the repellency film which covers the inner wall of the tube, and the interface shapes of the two kinds of liquids are changed. That is, as the voltage is strongly applied to the conductive aqueous solution, the radius of curvature of the interface portion of the conductive aqueous solution between the insulative oil and the conductive aqueous solution which first functioned as the concave lens is changed, and for example, the interface portion becomes completely flattened or the conductive aqueous solution functions as a convex lens, and the focal length is changed.

According to such a liquid lens, since the focal length can be changed without moving the lens, it is possible to realize zoom function and focus function without providing the cam mechanism or the lens driving mechanism. Therefore, the device can be made compact, and the device can be applied to a small device such as a mobile phone.

According to the liquid lens described in the non-patent document, even if voltage is applied and a target shape of the interface between the liquids can be obtained, since gravity is applied, the interface shape is distorted. As a result, there is a problem that the focus position of the liquid lens is deviated, and image deviation is generated in a shooting image.

SUMMARY OF THE INVENTION

The present invention has been made in view of the above circumstances and provides a lens unit and an image taking apparatus in which deterioration of optical characteristics caused by gravity is suppressed.

The present invention provides a lens unit comprising a liquid container in which mutually non-mixable light-transmitting insulative liquid and conductive liquid having different refractive indices are accommodated, and light passing through the liquid container at least in a predetermined optical axis;

a first electrode which comes into contact with the conductive liquid in the liquid container;

one or more second electrodes which are insulated from the conductive liquid in the liquid container; and a correcting section which controls voltage to be applied between the first electrode and at least one of the second electrodes in accordance with a gravity direction, thereby changing a shape of an interface between the insulative liquid and the conductive liquid to correct distortion of the interface caused by the gravity.

According to the lens unit of the invention, if voltage is applied between the first electrode and the second electrodes, electric charge is discharged in the conductive liquid from the first electrode, electric charge having pole that is opposite from the former electric charge is collected in the second electrodes, the electric charges having opposite poles are attracted each other by Coulomb force, and the shape of the interface between the conductive liquid and the insulative liquid is changed. At that time, although the gravity is applied to the lens unit, since the distortion of the interface between the conductive liquid and the insulative liquid is corrected by the shape change of the interface by the Coulomb force, the optical performance of the lens unit is maintained.

It is preferable that the number of second electrodes is two or more, the correcting section applies voltages having different magnitude between the first electrode and the second electrodes.

If the voltages having different magnitudes are applied between the first electrode and the second electrodes, the correction precision of the distortion of the interface between the conductive liquid and the insulative liquid by the gravity is enhanced. The voltages are applied between the first electrode and one or more of the second electrodes, the shape of the interface between the conductive liquid and the insulative liquid matches with a shape having desired optical characteristics, voltage is applied to the first electrode and the remaining second electrode, the distortion of the interface by the gravity is corrected, and a lens unit having desired optical characteristics can be realized precisely.

It is preferable that the lens unit further comprises an attitude sensor for detecting attitude of the lens unit, the correcting section applies voltage corresponding to output of the attitude sensor between the first electrode and the at least one of the second electrodes.

The degree of distortion of the interface between the conductive liquid and the insulative liquid by the gravity and the shape thereof are different depending upon the attitude of the lens unit, but according to the lens unit of a preferred embodiment of the invention, the distortion of the interface is precisely corrected by applying voltage corresponding to the attitude of the lens unit.

The invention provides an image taking apparatus comprising a liquid container in which mutually non-mixable light-transmitting insulative liquid and conductive liquid having different refractive indices are accommodated, and light passing through the liquid container at least in a predetermined optical axis;

a first electrode which comes into contact with the conductive liquid in the liquid container;

one or more second electrodes which are insulated from the conductive liquid in the liquid container;

a correcting section which controls voltage to be applied between the first electrode and at least one of the second electrodes in accordance with a gravity direction, thereby changing a shape of an interface between the insulative liquid and the conductive liquid to correct distortion of the interface caused by the gravity; and an imaging element in which subject light which passed through the insulative liquid and the conductive liquid is formed on a surface of the imaging element and an image signal representing the subject light is produced.

According to the image taking apparatus of the invention, like the lens unit of the invention, it is possible to suppress the distortion of the interface of liquid by the gravity, and to maintain the optical performance.

Only a basic form of the image taking apparatus of the invention is described here to avoid redundant explanation, but the image taking apparatus of the invention includes not only the basic form, but also various forms corresponding to the various forms of the lens unit.

According to the present invention, it is possible to provide a lens unit and an image taking apparatus in which deterioration of optical performance caused by gravity is suppressed.

DETAILED DESCRIPTION OF THE INVENTION

Prior to explanation of embodiment of the present invention, problems of the liquid lens described in the non-patent document will be explained in detail.

Figure 1A:
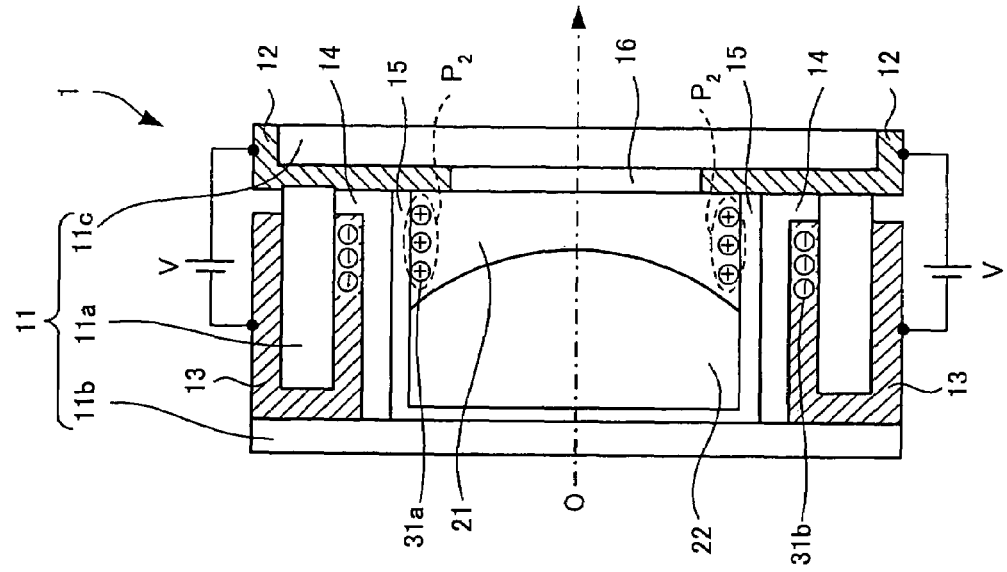
FIGS. 1(A) and 1(B) are schematic diagrams showing structure of a liquid lens according to a comparative example.
Figure 1B:
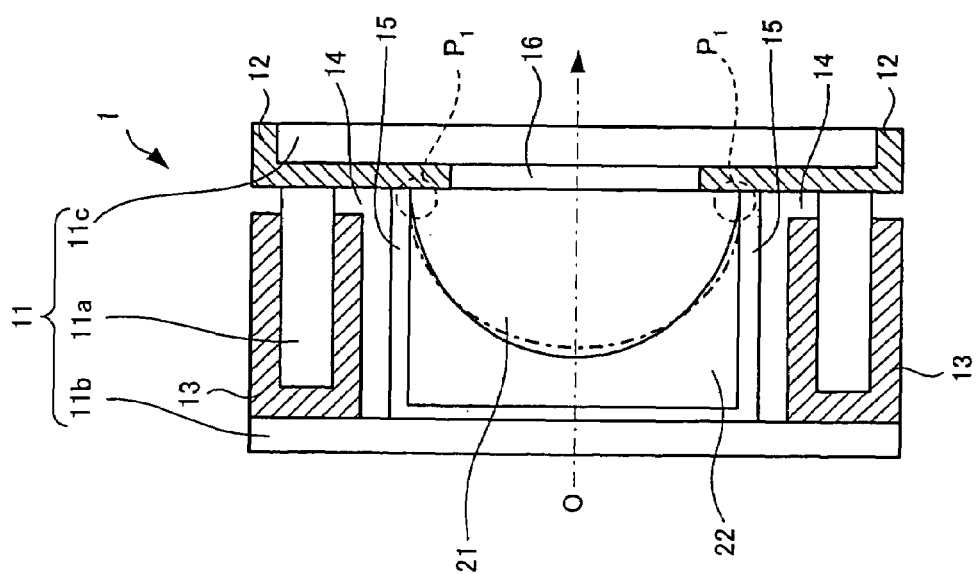

FIGS. 1(A) and 1(B) are schematic diagram showing a structure of a liquid lens of a comparative example. In the following explanation, light passes in the direction of the arrow O from left (in FIG. 1(A)) to right (in FIG. 1(B)).

As shown in FIGS. 1(A) and 1(B), a liquid lens 1 has a glass container 11 comprising a tube 11a. Both ends of the tube 11a are closed with caps 11b and 11c. Clear water 21 to which support electrolyte is added, and clear oil 22 which is insulative liquid are accommodated in the container 11 such that the water 21 and the oil 22 are not mixed with each other. Since oil 22 has higher refractive index of light than that of the water 21, the oil 22 functions as a lens which refracts light in the liquid lens 1.

An inner surface of the tube 11a and an inner surface of the cap 11b which closes the left end of the tube 11a of the container 11 are covered with repellency films 15 having repellency. An inner surface of the cap 11c which covers the right end of the tube 11a is covered with a hydrophilic film 16 which has an affinity for water.

An insulative film 14 is provided between the tube 11a and the repellency film 15. The liquid lens 1 is also provided with a first electrode 12 which is in contact with water 21, and a second electrode 13 which is insulative from water 21 by means of the insulative film 14.

When voltage is not applied between the first electrode 12 and the second electrode 13, as shown in FIG. 1(A), the water 21 repulses from the repellency film 15 and comes into contact with the hydrophilic film 16. Thus, a contact portion $P_1$ between the water 21 and the repellency film 15 becomes small. Therefore, water 21 is accumulated in a form of a semi-spherical shape, and oil 22 pushed by the water 21 is accumulated in a form obtained by subtracting the semi-spherical shape from a cylindrical shape. Since the shape of the interface between the water 21 and the oil 22 as viewed from the oil 22 is recessed shape, the liquid lens 1 functions as a concave lens in FIG. 1(A).

For example, if positive voltage is applied to the first electrode 12 and negative voltage is applied to the second electrode 13, positive electric charge 31a is discharged from the first electrode 12 to the water 21, and negative electric charge 31b is accumulated in the second electrode 13. At that time, the positive electric charge 31a discharged to the water 21 is attracted by the negative electric charge 31b of the second electrode 13 by the Coulomb force, and a contact portion $P_2$ between the water 21 and the repellency film 15 becomes great in accordance with the applied voltage. In FIG. 1(B), the shape of the interface between the water 21 and the oil 22 is a projecting shape when viewed from the oil 22, and the liquid lens 1 functions as a convex lens. It is possible to change the shape of the interface between the water 21 and the oil 22 little by little by adjusting the voltage applied to the first electrode 12 and the second electrode 13.

In this manner, even if a mechanism for moving the lens is not provided, it is possible to realize the zoom function and the focus function by changing the shape of the interface between the water 21 and the oil 22.

Here, it is ideal that the shape of the interface between the water 21 and the oil 22 matches with the shape shown with solid lines in FIGS. 1(A) and 1(B) by applying voltage to the first electrode 12 and the second electrode 13. However, since the gravity is applied to the liquid lens 1, the interface shape is distorted as shown with the chain line in FIGS. 1(A) and 1(B) in the actual case. As a result, the optical axis of the liquid lens 1 is deviated, and there is a problem that the optical performance of the liquid lens 1 is deteriorated.

The present invention is made based on the detailed analysis as described above.

An embodiment of the present invention will be explained with reference to the drawings.

Figure 2:
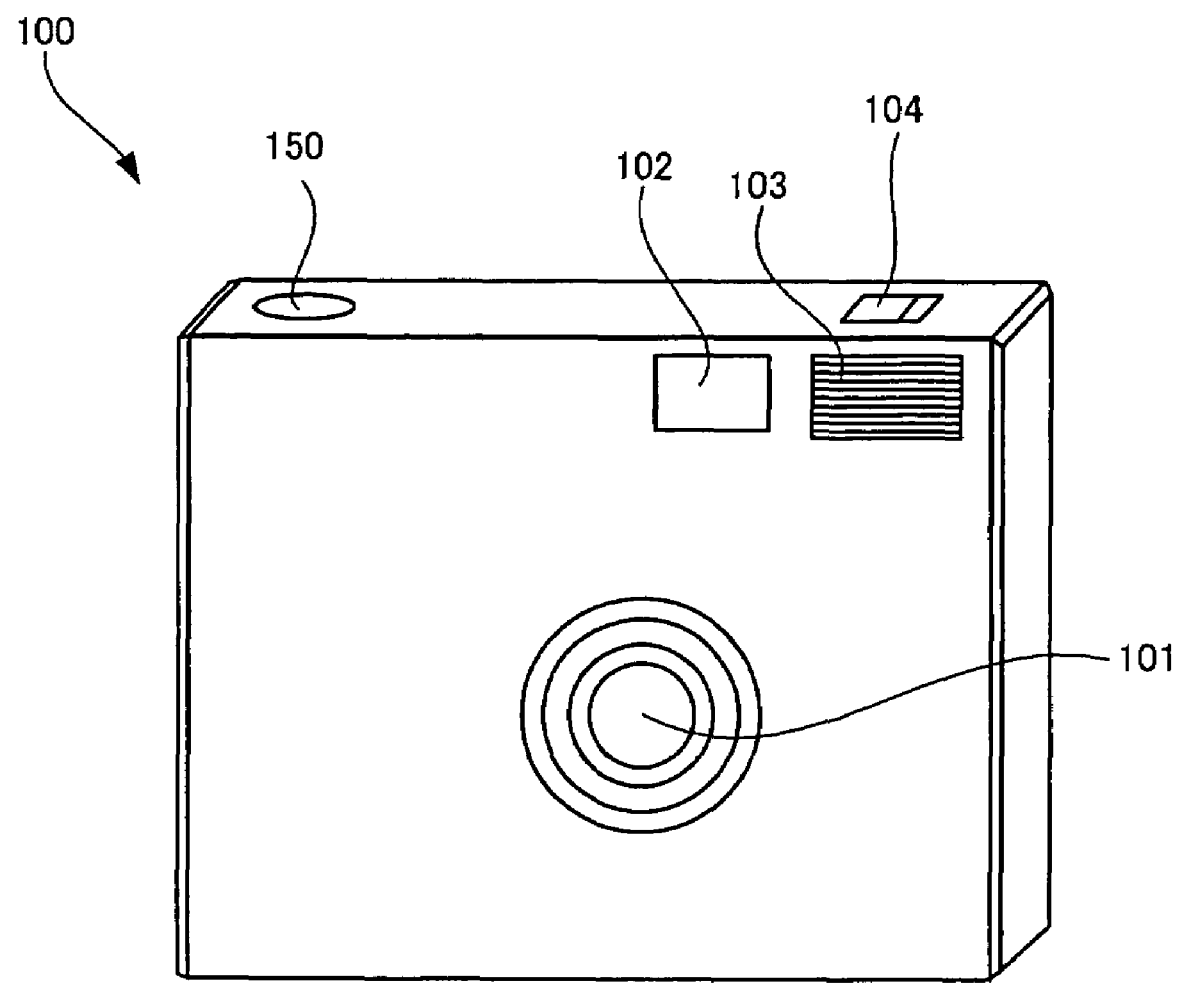
FIG. 2 is an outward perspective view of a digital camera as viewed from front and diagonally upper direction and to which an embodiment of the present invention is applied.

FIG. 2 is an outward perspective view of a digital camera as viewed from front and diagonally upper direction, to which an embodiment of the present invention is applied.

As shown in FIG. 2, this digital camera 100 is provided at its central portion of its front surface with a shooting lens 101. The digital camera 100 is provided at its upper portion of its front surface with an optical finder object window 102 and an auxiliary light emitting portion 103. The digital camera 100 is provided at its upper surface with a slide type power switch 104 and a release switch 150.

Figure 3:
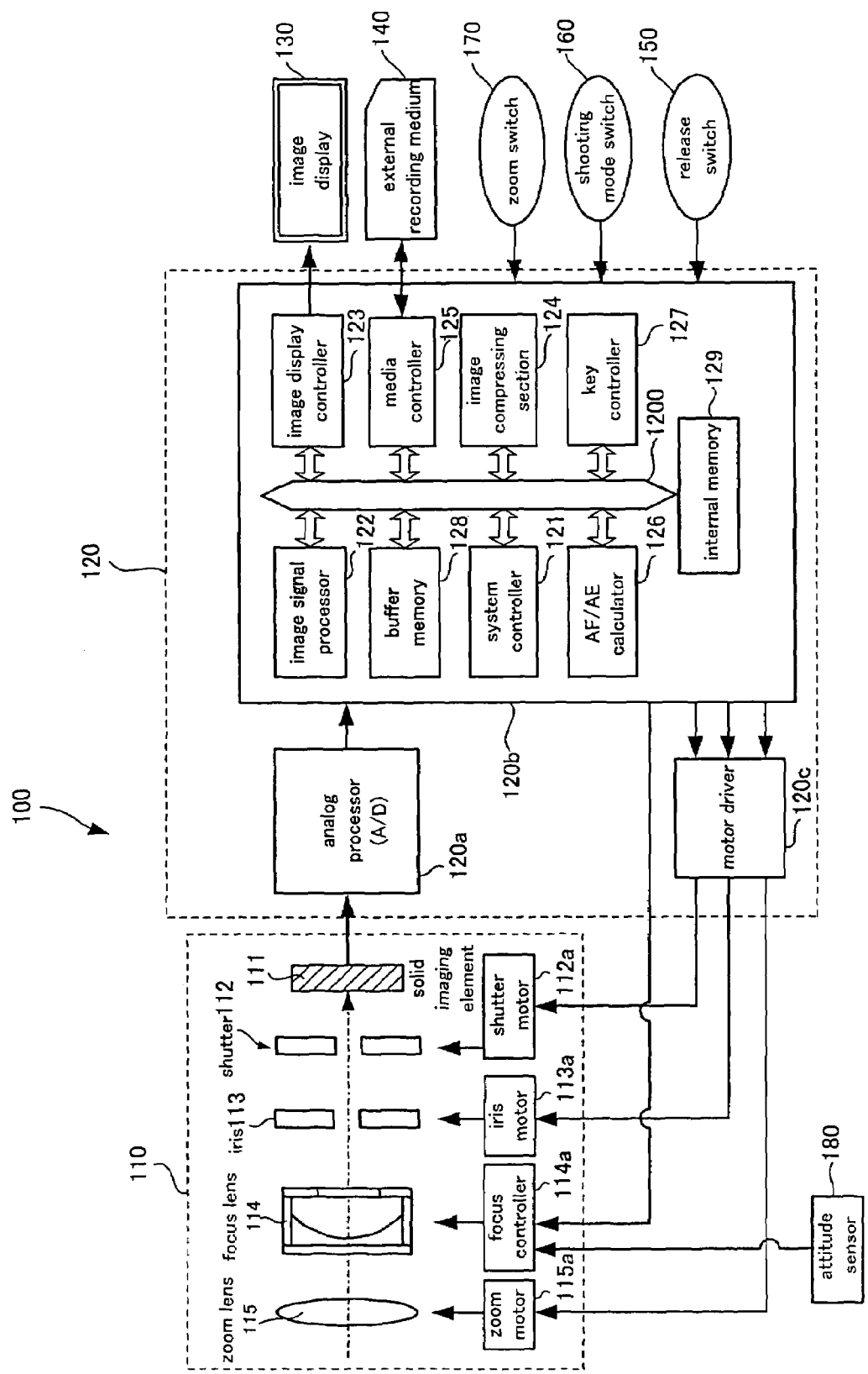
FIG. 3 is a schematic block diagram of the digital camera shown in FIG. 2.

FIG. 3 is a schematic block diagram of the digital camera 100 shown in FIG. 2.

As shown in FIG. 3, the digital camera 100 is roughly divided into a shooting optical system 110 and a signal processor 120. In addition, the digital camera 100 is also provided with an image display 130 for displaying a shot image, an external recording medium 140 for recording a signal of the shot image, a zoom switch 170, a shooting mode switch 160 and a release switch 150 for allowing the digital camera 100 to carry out various processing for shooting, and an attitude sensor 180 for detecting the attitude of the digital camera 100. The attitude sensor 180 corresponds to one example of an attitude sensor of the present invention.

The structure of the shooting optical system 110 will first be explained with reference to FIG. 3.

In the digital camera 100, subject light enters from left side in FIG. 3, the subject light passes through a zoom lens 115 and a focus lens 114 and passes through an iris 113 which adjusts light quantity of the subject light. Then, when a shutter 112 is opened, an image is formed on a solid imaging element 111. A CCD or CMOS sensor is used as the solid imaging element 111. The solid imaging element 111 corresponds to one example of an imaging element of the present invention. Usually, lenses are disposed in a shooting optical system. At least one of the lenses is largely involved in adjustment of focus, and relative positions of the lenses are involved in the focal length. In FIG. 3, the zoom lens 115 is schematically illustrated as a lens which is involved in changing the focal length, and the focus lens 114 is schematically illustrated as a lens which is involved in adjustment of the focus.

The zoom lens 115, the iris 113 and the shutter 112 are driven and moved by a zoom motor 115a, an iris motor 113a and a shutter motor 112a, respectively. The focus lens 114 is provided with a focus controller 114a instead of a motor for changing a lens shape of the focus lens 114. Instructions for operating the zoom motor 115a, the iris motor 113a and the shutter motor 112a are transmitted through a motor driver 120c from a digital signal processor 120b in the signal processor 120, and instructions for operating the focus controller 114a is transmitted directly from the digital signal processor 120b. A detection result (attitude of the digital camera 100) detected by the attitude sensor 180 is transmitted to the focus controller 114a. The focus controller 114a is operated in accordance with the instructions transmitted from the digital signal processor 120b and the detection result transmitted from the attitude sensor 180.

The zoom lens 115 is moved by the zoom motor 115a in a direction along the optical axis. If the zoom lens 115 is moved to a position corresponding to a signal from the signal processor 120, the focal length is changed, and shooting magnitude is determined.

The focus lens 114 realizes TTLAF (Through The Lens Auto Focus) function. Generally, this TTLAF function carries out such an action that a focus lens is moved in a direction along the optical axis and in this state, contrast of an image signal obtained by the solid imaging element 111 is detected by an AF/AE calculator 126 of the signal processor 120, and the focus lens 114 is adjusted to the focus position using a lens position where a peak of the contrast is obtained as the focus position. With this TTLAF function, it is possible to shoot an image while automatically bringing a subject (closest subject) where the contrast becomes peak into focus. In this embodiment, the closest subject is brought into focus by changing the lens shape of the focus lens 114 by means of the focus controller 114a instead of moving the focus lens 114. The structure of the focus lens 114 and a method for changing the lens shape will be explained in detail later.

The iris 113 is driven based on the instructions given from the AF/AE calculator 126 of the digital signal processor 120b, thereby adjusting the light quantity of the subject light.

The structure of the shooting optical system 110 is as described above.

Next, a structure of the signal processor 120 will be explained. A subject image formed on the solid imaging element 111 by the shooting optical system is read out into an analog processor (A/D) 120a as an image signal, an analog signal is converted into a digital signal by the analog processor (A/D) 120a, and the digital signal is supplied to the digital signal processor 120b. The system controller 121 is disposed in the digital signal processor 120b, and the signal in the digital signal processor 120b is processed in accordance with a program describing procedure of action in the system controller 121. Data is sent and received between the system controller 121, an image signal processor 122, an image display controller 123, an image compressing section 124, a media controller 125, an AF/AE calculator 126, a key controller 127, a buffer memory 128 and an internal memory 129 through a bus 1200. When data is sent and received therebetween through the bus 1200, the internal memory 129 is used as a buffer. Data that represents a variable is written in the internal memory 129 whenever necessary in accordance with the progress of the processing process of each section. In the system controller 121, the image signal processor 122, the image display controller 123, the image compressing section 124, the media controller 125, the AF/AE calculator 126 and the key controller 127, appropriate processing is carried out by referring to the data. That is, instructions from the system controller 121 are transmitted to the above elements through the bus 1200, and processing process of the elements rises. The data in the internal memory 129 is rewritten in accordance with the progress of the process, the data is referred to by the system controller 121, and actions of these elements are managed. In other words, the power is turned ON, and processes of the elements rise in accordance with procedure of the program in the system controller 121. For example, if the release switch 150, the zoom switch or the shooting mode switch is operated, information representing the fact that the switch was operated is transmitted to the system controller 121 through the key controller 127, and processing corresponding to this operation is carried out in accordance with the procedure of the program in the system controller 121.

If the releasing operation is carried out, the image data read out from the solid imaging element is converted from an analog signal to a digital signal by the analog processor (A/D) 120a, and this digitalized image data is once stored in the buffer memory 128 in the digital signal processor 120b. An RGB signal of this digitalized image data is converted into a YC signal by the image signal processor 122, the YC signal is compressed in JPEG compression manner by the image compressing section 124, and this image signal is stored in the external recording medium 140 through the media controller 125 as an image file. The image data stored as the image file is reproduced in the image display 130 through the image display controller 123. At the time of this processing, the AF/AE calculator 126 carries out the calculation of the focus adjustment and of the exposure. The AF/AE calculator 126 detects contrast for each subject distance from the RGB signal to adjust the focus. The focus is adjusted by the focus lens 114 based on this detection result. A bright signal is extracted from the RGB signal by the AF/AE calculator, and field brightness is detected therefrom. Based on this result, the exposure is adjusted by the iris 113 such that the light quantity of the subject light given to the solid imaging element becomes appropriate value.

The basic structure of the digital camera 100 is as described above.

The digital camera 100 of this invention is characterized in the focus lens 114 whose shape is adjusted in accordance with the detection result of the attitude sensor 180.

The attitude sensor 180 will be explained first.

Figure 4:
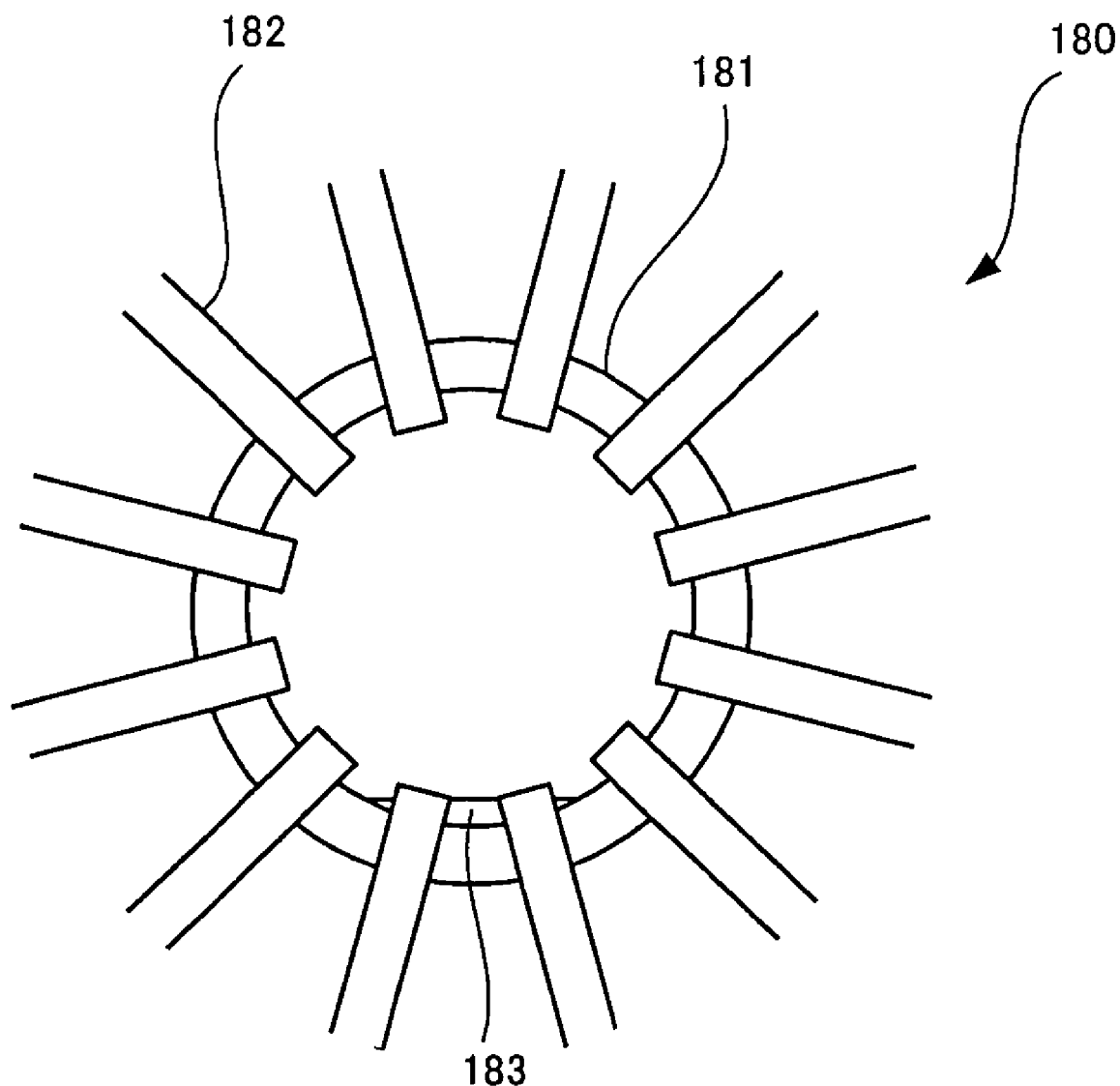
FIG. 4 is a schematic diagram showing a structure of an attitude sensor.

FIG. 4 schematically shows a structure of the attitude sensor 180.

The attitude sensor 180 includes a cylindrical hermetic container 181, and electrodes 182 inserted into the hermetic container 181 radially. Conductive liquid 183 (mercury in this embodiment) is charged into the hermetic container 181. The attitude sensor 180 is disposed in the digital camera 100 such that the axis of the cylindrical hermetic container 181 extends along the optical axis of the digital camera 100.

Different numbers corresponding to the positions of the electrodes 182 are respectively allocated to the electrodes 182.

If the digital camera 100 is moved, liquid 183 in the hermetic container 181 flows in the vertical direction by the gravity, and the liquid 183 comes into contact with one or some of the electrodes 182 which are located vertically lower side in the attitude of the digital camera 100 at that time. The electrode 182 being in contact with the liquid 183 is energized, and the attitude of the digital camera 100 is judged based on the number allocated to the energized electrode 182. The judgment result is transmitted to the focus controller 114a shown in FIG. 3.

Next, the focus lens 114 will be explained.

Figure 5:
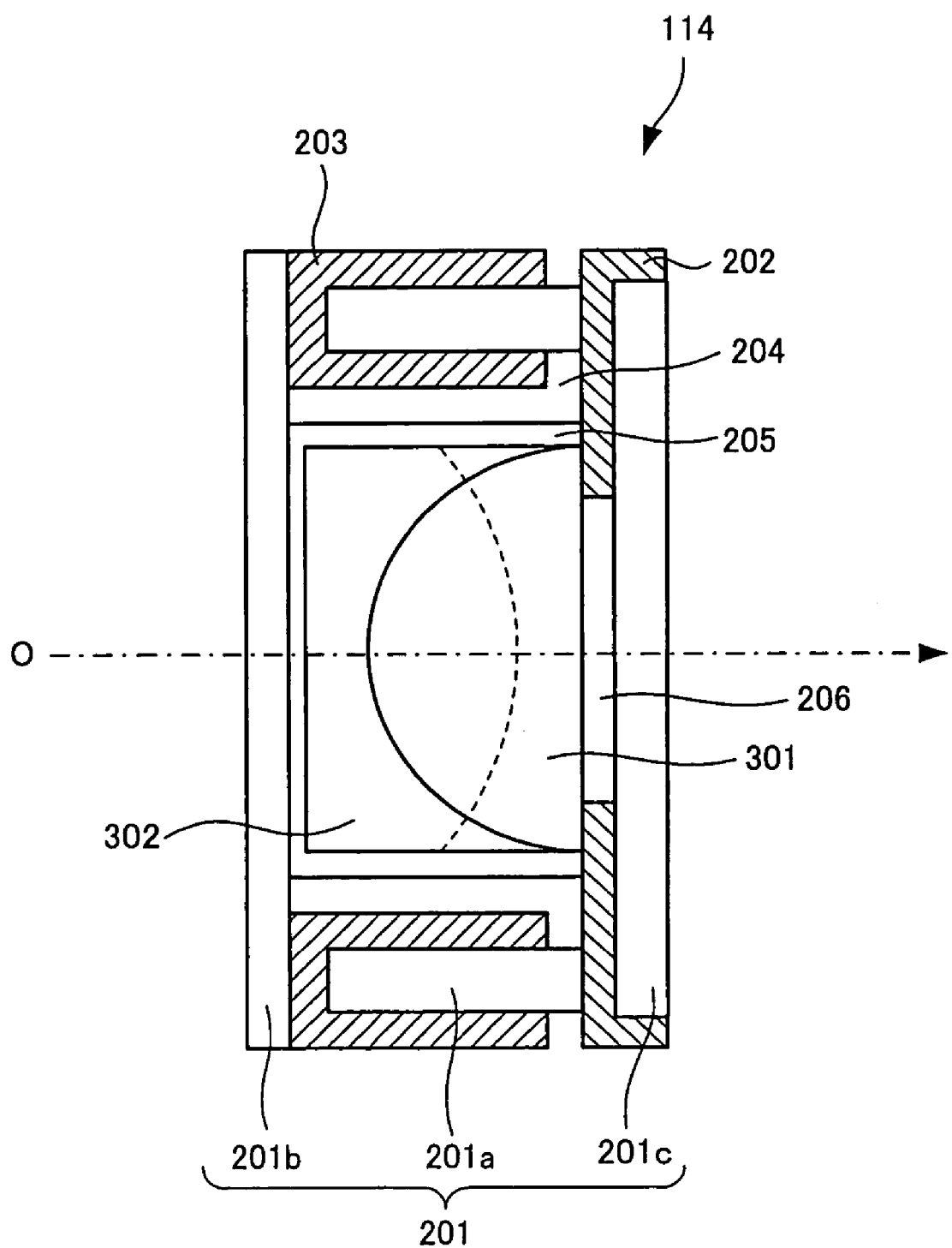
FIG. 5 is a schematic diagram showing a structure of a focus lens.

FIG. 5 schematically shows a structure of the focus lens. Subject light enters from left side in FIG. 5 in the direction of the arrow O. In the following explanation, the entering side of the light (left side in FIG. 5) is defined as front, and the going side of the light (right side in FIG. 5) is defined as rear.

The focus lens 114 includes a liquid container 201 comprising a tube 201a. Both ends of the tube 201a are closed with caps 201b and 201c. Conductive liquid 301 and insulative liquid 302 which can not be mixed with the conductive liquid 301 are accommodated in the liquid container 201. The liquid container 201 is made of clear glass, and the liquid container 201 corresponds to one example of the liquid container of this invention.

A surface (inner surface) of the cap 201c which covers the rear end of the tube 201a that comes into contact with liquid is covered with a hydrophilic film 206. A portion of an inner surface of the liquid container 201 other than that covered with the hydrophilic film 206 is covered with a hydrophobic film 205.

The liquid container 201 is also provided with a first electrode 202 which is disposed such as to sandwich the hydrophilic film 206 and which comes into contact with liquid, an insulative film 204 sandwiched between the tube 201a and the hydrophobic film 205, and second electrodes 203 insulated from liquid by the insulative film 204.

Figure 6:
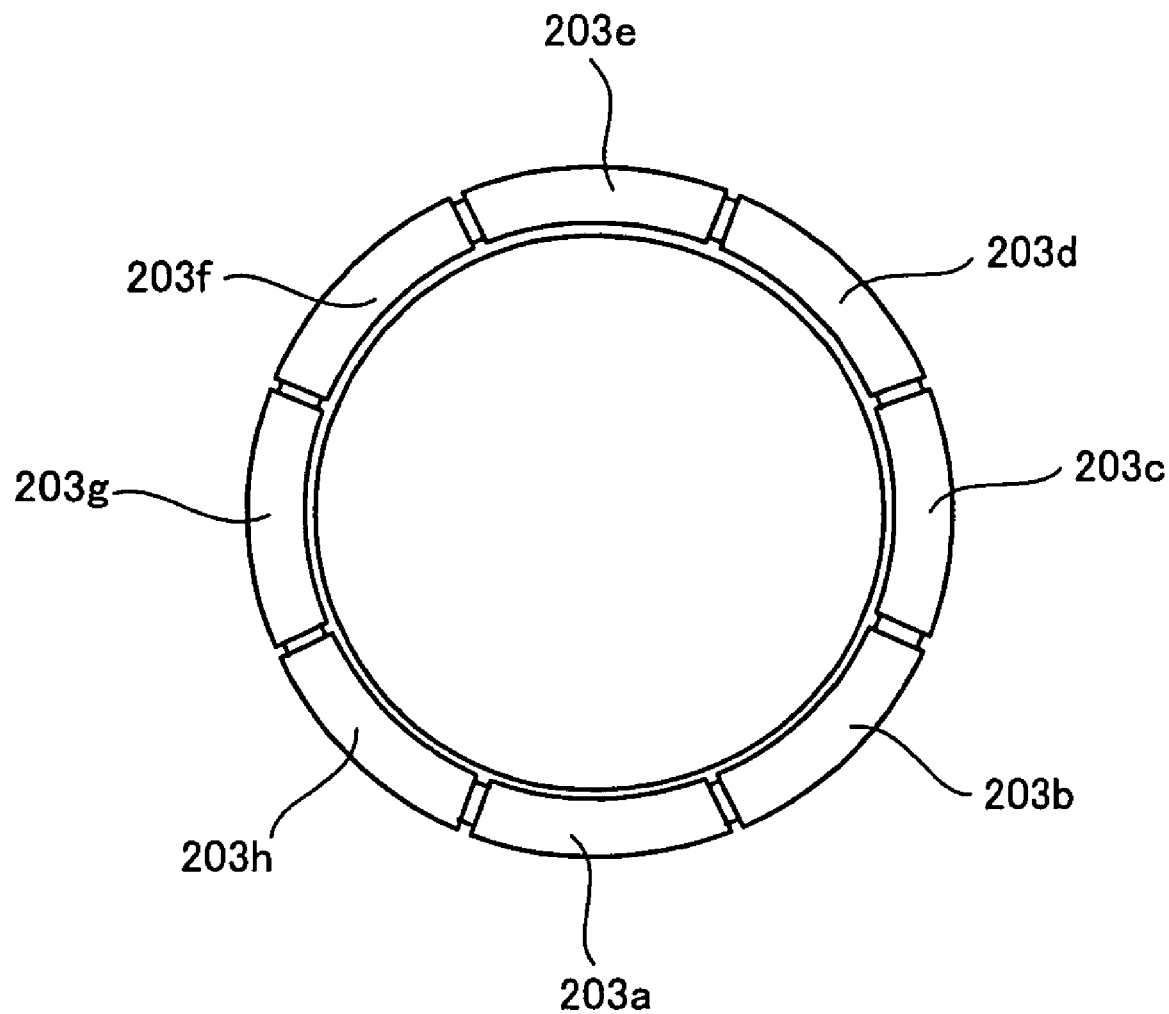
FIG. 6 is a diagram of the focus lens shown in FIG. 5 as viewed from front (left side in FIG. 5).

FIG. 6 shows the focus lens 114 shown in FIG. 5 as viewed from front (left side in FIG. 5).

As shown in FIG. 6, the second electrodes 203 (203a, 203b, 203c, 203d, 203e, 203f, 203g, 203h) are provided such as to surround the tube 201a.

The first electrode 202 and the second electrodes 203 are connected to the focus controller 114a shown in FIG. 3. Voltage is applied between the first electrode 202 and the second electrodes 203 by the focus controller 114a. The first electrode 202 corresponds to one example of the first electrode of the present invention, and the second electrode corresponds to the second electrode of the invention. The focus controller 114a corresponds to one example of a correcting section of the invention.

The conductive liquid 301 and the insulative liquid 302 having different refractive index of light are accommodated in the liquid container 201. In this embodiment, water to which support electrolyte (tetrabutyl ammonium perchlorate 0.1 mol/L) is added is used as the conductive liquid, and organic solvent (Isopar: produced by Exxon Corp.) is used as the insulative liquid 302. The conductive liquid 301 corresponds to one example of the conductive liquid of the present invention, and the insulative liquid 302 corresponds to one example of the insulative liquid of the invention.

When voltage is not applied between the first electrode 202 and the second electrodes 203, the conductive liquid 301 repulses from the repellency film 205, and the interface between the conductive liquid 301 and the insulative liquid 302 takes a shape shown with the solid lines shown in FIG. 5. At that time, the first electrode 202 and the conductive liquid 301 come into contact with each other.

If the focus controller 114a applies voltage between the first electrode 202 and the second electrodes 203, electric charge is discharged from the first electrode 202 to the conductive liquid 301, and electric charge having pole opposite from the electric charge discharged to the conductive liquid 301 is collected in the second electrodes 203. The electric charge discharged to the conductive liquid 301 and the electric charge of the second electrodes 203 are attracted to each other by the Coulomb force, and the electric charge in the conductive liquid 301 is attracted close to the repellency film 205. As a result, the shape of the interface between the conductive liquid 301 and the insulative liquid 302 is changed to a shape shown with dotted line in FIG. 5.

Using this focus lens 114, the TTLAF function is realized in the following procedure.

First, the solid imaging element 111 shown in FIG. 3 obtains an image signal while changing the shape of the interface between the conductive liquid 301 and the insulative liquid 302 by changing the voltage applied between the first electrode 202 and the second electrodes 203 little by little. Then, the AF/AE calculator 126 detects contrast of the image signal, and voltage when peak of the contrast is obtained is applied between the first electrode 202 and the second electrodes 203. By shooting in a state in which the lens shape is thus determined, it is possible to bring a closest subject into focus.

Here, if the focus controller 114a applies the same voltages between the first electrode 202 and the second electrodes 203 in accordance with the operation instructions transmitted from the AF/AE calculator 126, the interface between the conductive liquid 301 and the insulative liquid 302 is distorted by the gravity applied to the focus lens 114. To correct this distortion, the focus controller 114a applies different voltages between the first electrode 202 and the second electrodes 203 corresponding to the detection result of the attitude sensor 180 in addition to the voltages corresponding to the operation instructions transmitted from the AF/AE calculator 126.

In the internal memory 129 shown in FIG. 3, there is previously stored a corresponding relation between an attitude of the digital camera 100 and a correction voltage value which is necessary to correct the distortion caused by gravity of the interface between the conductive liquid 301 and the insulative liquid 302 in that attitude. For example, when the digital camera 100 is in such an attitude that the second electrode 203e comes up as shown in FIG. 6, the second electrodes 203 are in association with such correction voltages that voltage applied between the first electrode 202 and the second electrodes 203a (voltage applied to the first electrode 202 and the second electrodes 203x is called voltage 203x, hereinafter)>(voltage 203b and voltage 203h) >(voltage 203c and voltage 203g)>(voltage 203d and voltage 203f)>voltage 203e. By applying such correction voltages, a preferable shape of the interface between the conductive liquid 301 and the insulative liquid 302 is maintained.

If voltage for realizing the TTLAF function is instructed from the AF/AE calculator 126, the focus controller 114a obtains a detection result of the attitude of the digital camera 100 from the attitude sensor 180. Then, the focus controller 114a obtains a correction voltage value corresponding to the attitude of the digital camera 100 transmitted from the attitude sensor 180 in the corresponding relation stored in the internal memory 129 shown in FIG. 3. If the correction voltage value corresponding to the attitude of the digital camera 100 is obtained, voltage to which voltage for realizing the TTLAF function and the correction voltage are added is applied between the first electrode 202 and the second electrodes 203.

If voltage is applied between the first electrode 202 and the second electrodes 203, the shape of the interface between the conductive liquid 301 and the insulative liquid 302 is changed in accordance with the instructions from the AF/AE calculator 126 by the Coulomb force caused by the voltage for realizing the TTLAF function, and the distortion of the interface is corrected by the correction voltage. Deterioration of the optical characteristics of the focus lens 114 caused by the gravity is suppressed, and the TTLAF function can be precisely realized by the digital camera 100.

Although the two kinds of liquids, i.e., the conductive liquid and insulative liquid are accommodated in the liquid container of this embodiment, three or more kinds of liquids may be accommodated in the liquid container of the invention.

Although two or more second electrodes are provided in the embodiment, only one second electrode may be provided when the lens unit of the invention is applied to a camera which carries out vertical TTLAF function. In this case, in addition to voltage for TTLAF function which vertically deforms the interface of the liquid, if the correction voltage for changing the interface of the liquid is applied to direction opposite from the gravity direction (vertical direction), the distortion of the interface of the liquid caused by the gravity can be corrected.

In the above embodiment, voltage for realizing the TTLAF function, and voltage for correcting the distortion of the interface of the liquid caused by the gravity are applied between the first electrode and all of the second electrodes. Alternatively, in the lens unit of the present invention, the second electrodes may be divided into electrodes for realizing the TTLAF function and electrodes for correcting the distortion, voltage for realizing the TTLAF function may be applied between the first electrode and the TTLAF second electrodes, and voltage for correcting the distortion of the interface of the liquid caused by the gravity may be applied between the first electrode and the distortion correcting second electrodes.

Although the lens unit of the present invention is applied to the focus lens in the embodiment, the lens unit may be applied to a zoom lens.

Although correction in the rotation direction around the optical axis of the digital camera is explained, it is also possible to correct in an elevation angle direction in addition to the rotation direction around the optical axis by providing electrodes in the spherical hermetic container as the attitude sensor.

Various embodiments capable of being employed for the various elements which constitute the present invention will be described next.

The conductive liquid and the insulative liquid of the present invention may be two or more kinds of liquids having different refractive indices and which are not mixed with each other. It is preferable that a difference of specific gravity of these liquids is 0.1 or less.

The combination of these liquids is not limited, but a combination of water and organic solvent is preferable. Preferable organic solvents are hydrocarbon (hexane, heptane, pentane, octane, Isopar (produced by Exxon Corp.)), hydrocarbon-based aromatic compound (benzene, toluene, xylene, mesitylene and the like), halogen-based hydrocarbon (difluoro propane, dichloroethane, chloroethane, bromoethane and the like), halogen-based or hydrocarbon-based aromatic compound (chloro benzene and the like), ether-based compound (diphenyl ether, anisole, diphenyl ether and the like).

It is preferable that support electrolyte is added to water to enhance the electric conductivity. As the support electrolyte, TMAP: Tetramethylammonium perchlorate or TBAF: Tetrabutylammonium hexafluorophosphate is used.

The basic embodiment for realizing the conception of the present invention has been explained. To bring the lens unit employed for the invention into practical use, it is preferable to take a measure for preventing inconvenience that dust or water attaches to the optical path and the lens performance is deteriorated.

It is preferable that a repellency film is provided on an outer surface (light-transmitting surface, hereinafter) which intersects with the optical path of the container in which the liquids are accommodated. If the light-transmitting surface is provided with repellency, dust or water drop is prevented from attaching, and high light-transmission of the lens unit can be maintained. Preferable materials of the repellency film are silicon resin, block copolymer of organo polysiloxane, fluorine polymer, and polytetrafluoroethane.

It is also preferable to provide the light-transmitting surface of the container constituting the lens unit with a hydrophilic film. By providing the light-transmitting surface with hydrophilic characteristics also, dust can be prevented from attaching. Preferable materials of the hydrophilic film are surface-active agent such as acrylic polymer, non-ion organo silicon surface-active agent. To produce the hydrophilic film, silane-based monomer plasma polymerization, or ion beam processing may be used.

It is also preferable that the light-transmitting surface of the container constituting the lens unit is provided with light catalyst such as titanium oxide. Contamination is dissolved by light catalyst which reacted with light, and the light-transmitting surface can be kept clean.

It is preferable that the light-transmitting surface of the container constituting the lens unit is provided with an antistatic film. If static is accumulated in the light-transmitting surface of the container or the electrode bears electrical charges, dust may be adversely attached. If the light-transmitting surface is provided with the antistatic film, it is possible to prevent such unnecessary material from attaching, and the light-transmission of the lens unit can be maintained. It is preferable that the antistatic film is made of polymer alloy material. It is especially preferable that the polymer alloy material is polyether-based material, polyether ester amid-based material, material having cationic group, and Reolex (tradename: Dai-Ichi Kogyo Seyaku Co., LTD.). It is preferable that the antistatic film is produced by mist method.

A soil-resistant material may be used for the container constituting the lens unit. Preferable soil-resistant material is fluorine resin. Concretely, preferable materials are fluorine alkyl alkoxy silane compound, polymer including fluorine alkyl group and oligomer, and functional group which can be cross-linked with hardening resin is especially preferable. It is preferable that the amount of soil-resistant material to be added is minimum amount which is necessary to exhibit the soil-resistant performance.

What is claimed is:

1. A lens unit comprising:
   a liquid container in which mutually non-mixable light-transmitting insulative liquid and conductive liquid having different refractive indices are accommodated, and light passing through the liquid container at least in a predetermined optical axis;
   a first electrode which comes into contact with the conductive liquid in the liquid container;
   one or more second electrodes which are insulated from the conductive liquid in the liquid container; and
   a correcting section which controls voltage to be applied between the first electrode and at least one of the second electrodes in accordance with a gravity direction, thereby changing a shape of an interface between the insulative liquid and the conductive liquid to correct distortion of the interface caused by the gravity.

2. The lens unit according to claim 1, wherein
   the number of second electrodes is two or more,
   the correcting section applies voltages having different magnitude between the first electrode and the second electrodes.

3. The lens unit according to claim 1, further comprising an attitude sensor which detects attitude of the lens unit, wherein
   the correcting section applies voltage corresponding to output of the attitude sensor between the first electrode and the at least one of the second electrodes.

4. An image taking apparatus comprising:
   a liquid container in which mutually non-mixable light-transmitting insulative liquid and conductive liquid having different refractive indices are accommodated, and light passing through the liquid container at least in a predetermined optical axis;
   a first electrode which comes into contact with the conductive liquid in the liquid container;
   one or more second electrodes which are insulated from the conductive liquid in the liquid container;
   a correcting section which controls voltage to be applied between the first electrode and at least one of the second electrodes in accordance with a gravity direction, thereby changing a shape of an interface between the insulative liquid and the conductive liquid to correct distortion of the interface caused by the gravity; and
   an imaging element in which subject light which passed through the insulative liquid and the conductive liquid is formed on a surface of the imaging element and an image signal representing the subject light is produced.

* * * * *